UNITED STATES PATENT OFFICE 1,920,382

NEUTRAL-IMPEDANCE DEVICE

Samuel B. Griscom and Robert D. Evans, Swissvale, Pa., assignors to Westinghouse Electric and Manufacturing Company, a Corporation of Pennsylvania Application June 5, 1931. Serial No. 542,348

13 Claims. (Cl. 172—237)

Our invention relates to alternating-current electric systems, and has particular relation to the construction and arrangement of neutral-grounding impedance devices used as a means of suppressing accidental ground faults which may occur within the systems.

In the use of reactors connected between neutral points and grounds of alternating-current systems for suppressing arcs to ground, there is considerable practical difficulty in properly adjusting such neutral reactance devices to the critical value of reactance that will cause the arc to become extinguished. As is known, the function of a neutral grounding reactor is to neutralize the capacitance current to ground, of the ungrounded portion of the system, by permitting a reactive current to pass from the neutral point to ground upon the occurrence of an accidental grounding of one of the system lines, that is substantially equal in magnitude to the capacity current, to thus suppress the earth current at the point of breakdown. In practice, it has been found that neutral grounding reactors function most effectively within a rather narrow range of adjustment or tuning.

The difficulty of maintaining the grounding reactor in a tuned condition with respect to the system increases as the circuit in use in the system varies from time to time, since a particular value of reactance compensates only for a particular value of system capacitance to earth. Also, it is difficult to determine exactly what the proper value of reactance should be, or how close to exact resonance and on which side,—capacitive or inductive—, the tuning should be done, even for a constant or unchanging value of system capacitance to earth.

Our invention is directed to a practical solution to this problem of neutral-grounding-device tuning, and in applying our invention to alternating-current systems, we are able to obtain additional operating advantages which permit a much higher degree of system protection than has been possible heretofore.

Tests have shown that, when the neutral reactance devices are tuned to the value required for arc suppression at points of breakdown to ground, the distribution of fault currents over the system tends to become unaffected by the specific location of the fault, such distribution being determined almost entirely by the location of the neutral reactance grounding devices and by the system characteristics. Because of this lack of close relationship between the fault location and the magnitude of the fault or residual currents, selection and isolation of faulty portions of the system by relay action is made extremely difficult. In the past, such selection has been practically impossible.

It has been found, however, that, if the value of reactance in a neutral grounding circuit is lowered considerably below the arc-suppressing condition, the fault current, in the case of a solid or metallic ground fault, with which the arc-suppressing feature would be ineffectual and unnecessary, may be increased to some magnitude sufficient to actuate protective relays of the type now well known and extensively applied in the art. Our invention is additionally directed to a method of sectionalizing portions of the system which are faulted for appreciable lengths of time.

It is, accordingly, an object of our invention to provide a neutral grounding device for alternating-current systems which will eliminate the need for the precise and frequent tuning adjustments which have heretofore been necessary to obtain the reactance value essential to the most effective suppression of arcs caused by accidental ground faults.

Another object of our invention is to provide a neutral-grounding device which shall be self-compensating for changes in the capacitance to earth of the system with which it is utilized.

An additional object of our invention is the provision of a neutral grounding device which permits, in the case of a solid fault from line to ground, of an isolation by protective relay action of the faulted section.

A still further object of our invention is to provide a neutral grounding device which, in addition to suppressing the arcs resulting from intermittent ground faults, will also permit a sufficient fault current to flow, in the case of a persisting fault, to cause protective relay action for isolating the faulted section from the remainder of the system.

More specifically stated, the object of our invention is to provide a neutral grounding device which, upon the occurrence of a fault, will vary its reactance progressively through a range which includes, first, the value suitable for effecting arc suppression, at intermittent ground faults, and, later, another value which establishes, in the case of persisting or solid faults, a sufficient current flow to cause actuation of protective relays associated with the system.

To provide for both of these functions of "arc suppression" and "fault current creation", we provide variable reactors of appropriate form and in appropriate locations in the neutral circuit of the system, the unique features of these reactors being that they are capable of automatically varying through such a range of reactance that the upper limit will be above the value required to extinguish the arc, and the lower limit will be such as to permit fault currents of sufficient value to cause the operation of sectionalizing relays which disconnect the faulty portion from the system. This variation is properly controlled, or initiated, so that the cycle of reactance change will take place whenever a ground fault develops.

In practice, it may be found preferable not to restrict the number of variable reactor coils so utilized to one, since, in any given system, a plurality of such coils can be employed to advantage in different locations, and also in combination with other reactors having fixed electrical dimensions.

Our invention, together with additional advantages and objects thereof, will best be understood through the following description of specific embodiments, when taken in conjunction with the accompanying drawings, in which.

Fig. 5 is a diagram of curves illustrating the characteristics of the device of Fig. 4, Fig. 6 diagrammatically illustrates a third embodiment of our invention as applied to a three-phase system with which may be combined a group of protective relays and associated sectionalizing means, Fig. 7 is a diagram of curves showing the characteristics of the device of Fig. 6, and its functioning in the system with which it is connected, and Fig. 8 diagrammatically illustrates a modification of the grounding device shown in Fig. 6.

Figure 1:
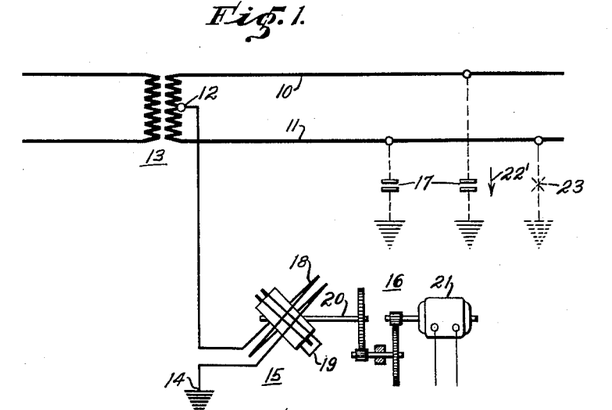
Figure 1 illustrates, in diagrammatic view, apparatus embodying our invention applied to a single-phase system.

Referring to the drawings, particularly Fig. 1 thereof, reference numerals 10 and 11 designate the conductors or lines of an ungrounded, single-phase power circuit having a neutral point 12, established by any suitable means, such as a mid-tap connection to one winding of the transformer 13 with which the power circuit is associated. Between the system neutral 12 and the ground 14 is connected the grounding device 15.

The capacitance to ground of the line conductors 10 and 11 is diagrammatically represented by the condenser symbols 17.

Figures 2, 3:
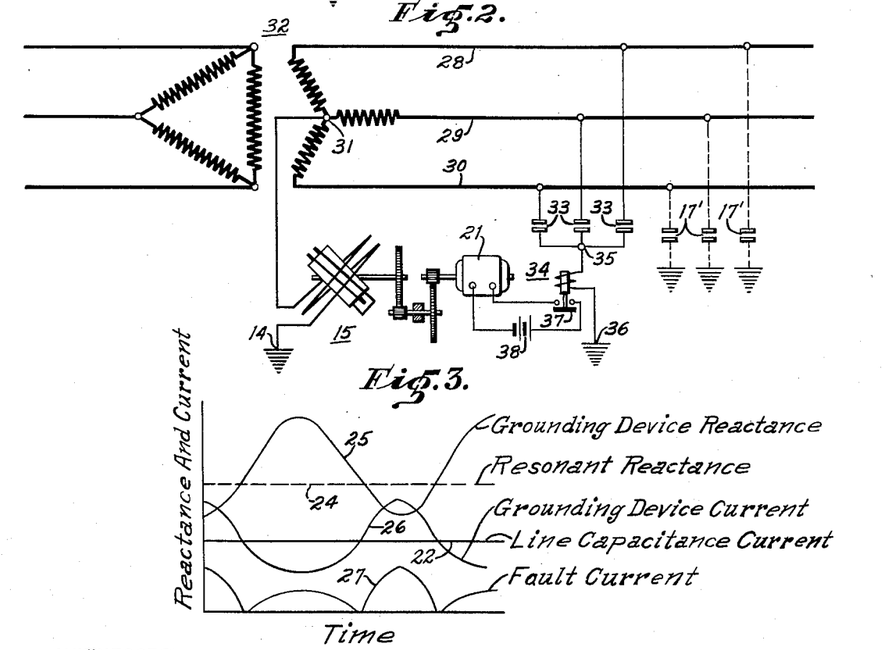
Fig. 2 is a diagrammatic view showing the embodiment of our invention illustrated in Fig. 1 as applied to a three-phase system and disposed for automatic control.
Fig. 3 is a diagram of curves illustrating the operating characteristics and functioning of the device of Figs. 1 and 2.

Upon the application of an alternating-current voltage to the circuit of Fig. 1, each of the circuit conductors 10 and 11, by virtue of this capacitance to ground, draws a charging or line-capacity current of a value which may be indicated by the horizontally drawn curve 22 of Fig. 3. It will be recognized that this current, represented by curve 22, bears a leading phase relation of 90° with respect to the voltage acting in the single-phase circuit, between conductors 10 and 11, since, when the system conductors are ungrounded, as during normal operation, the neutral 12 may be assumed to be at substantially zero or ground potential, and the voltage between each circuit conductor and ground will be approximately one-half of the total voltage acting in the circuit. For line conductor 10, this charging current may be vectorially represented by the downwardly pointing arrow, designated in Fig. 1 by numeral 22'.

Let it be assumed that, when the system neutral 12 is in no way connected to ground, conductor 11 becomes accidentally grounded, in a manner indicated by the dotted circuit 23. This, in effect, places conductor 11 at ground potential, and, upon the interruption of this grounding circuit 23, there will be a tendency for an arc to build up at the point where the circuit is broken, since the charging current from conductor 10 must return to ground through the connection or fault 23, and this charging current will tend to maintain the arc there set up. By providing some means for neutralizing this current, it is evident that the difficulties arising from such a condition may be eliminated.

One solution for the problem has been presented in the form of a neutral grounding reactance which, when properly adjusted, carries a current, from the system to ground, which neutralizes the charging current of the ungrounded portion of the system, thus leaving no current to flow through the fault. Thus, in the system of Fig. 1, neutral grounding device 15 may be made to perform this function of arc suppression, and, when arranged in accordance with our invention, provides a self-tuning feature which automatically insures maximum effectiveness, an advantage not heretofore obtainable.

The grounding device represented at 15 is in the form of a variometer and comprises a stationary winding 18 and a movable winding 19 so arranged that rotation of the shaft 20, upon which winding 19 is mounted, changes the degree of the magnetic coupling between it and winding 18 to correspondingly change the reactance offered by winding 18 to the flow of alternating current therethrough. It will be observed that winding 18 is connected to complete a circuit from the system neutral 12 to ground 14, and that winding 19 is short circuited upon itself.

To provide the automatic or self-adjusting feature for grounding device 15, means for effecting rotation of shaft 20 are associated therewith. As illustrated at 16, one form of such operating means may comprise a motor 21 disposed to rotate shaft 20 through suitable reduction gearing. The motor may be arranged to operate continuously or to operate only when a ground fault occurs, as through the action of control means not shown in Fig. 1.

In Fig. 3, curve 24 represents the resonant or effective arc-suppression value of reactance of the neutral grounding device for the system under consideration. Curve 25 represents the variation in the reactance presented by grounding device 15 when movable coil 19 is rotated by motor 21. It will be understood that the low-reactance points on curve 25 occur at times when the coupling between the two variometer coils is maximum, and the high points occur when the coupling between the coils is minimum, or when they are in the 90° position shown in the drawings, and that intermediate points on the curve correspond to intermediate values of coil coupling.

By so proportioning device 15 that the fault-current neutralizing value of reactance lies within the range of its variation, and, by providing means for causing it to be continuously changing value from maximum to minimum and minimum to maximum, it is evident that the problem of tuning is automatically taken care of, since, as is illustrated by the curves 24 and 25, respectively, the critical value is periodically passed through, indicated by these two curves, at their points of intersection.

In Fig. 3 also, curve 26, which applies to the system when one of the line conductors is faulted, represents the current which flows through the grounding device 15 when it is caused to vary its reactance, in the manner represented by curve 25. The proportions of the grounding device may be so chosen, as previously mentioned, that the grounding coil current, given by curve 26, is, for the resonance condition, of equal magnitude to the line-capacitance current, given by curve 22, and, since the grounding circuit presents principally an inductive reactance, the grounding coil current will lag the voltage acting in the power circuit by an angle of substantially 90°, so that the current which flows through the fault, previously assumed as having occurred at 23 on conductor 11 of Fig. 1, will be the difference in the magnitudes of the grounding coil and line-capacitance current values. This difference is represented by curve 27 of Fig. 3. From these curves, it will be observed that, for the assumptions made, the resonance value of the grounding reactance results in zero fault current, which is the condition desired for extinguishing any arc which may be set up at the point of breakdown.

In Fig. 2, a three-phase power circuit, designated by conductors 28, 29 and 30, respectively, has a neutral 31 established through the star-delta transformer illustrated at 32, which may be assumed to comprise a part of the power-circuit equipment. It will be understood, however, that any other suitable means for establishing a neutral point 31 may be utilized. As in the case of Fig. 1, symbols 17' indicate the capacitances to earth of the three lines.

Variable-reactance grounding device 15 is combined with the system of Fig. 2 in the same manner as was explained for Fig. 1, and includes, in the form of a suitable motor 21, means for causing the device to vary its reactance throughout a given range.

As in the system of Fig. 1, motor 21 may be arranged for continuous operation. However, to make unnecessary the operation of the variable-reactance device when the system protected is unfaulted, control means for the motor 21, responsive to the occurrence of an accidental ground fault in the system, may be provided. As shown, such control means may comprise a group of star-connected condensers 33, connected, as indicated, to the three line conductors 28, 29 and 30, and a current-responsive-relay 34, connected between the neutral 35 of the star-connected condensers and the ground 36. A ground fault on any one of the three lines produces an unbalance in the voltages acting upon condensers 33, and a corresponding unbalance in the currents flowing therein, with the result that the unbalanced current flows from point 35 to ground through the coil of relay 34, causing the relay to move to the actuated position, in which contacts 37 are closed to energize motor 21 from any suitable source of supply, such as battery 38.

Thus energized, motor 21 starts to rotate and causes the neutral grounding device to vary its reactance, which, in passing through the critical values, in the manner explained for the system of Fig. 1, causes the desired arc extinction.

Once the fault has been cleared from the line, and the normal balanced-voltage conditions restored, current flow through the coil of relay 34 ceases, and contact 37 moves to the open position, deenergizing motor 21, which causes further movement and variation of the grounding reactance to discontinue.

It will be understood that the variable-reactance grounding device 15 may be of any suitable form and need not necessarily be confined to that of the variometer illustrated and described, since, for instance, a motor-driven, multi-contact face plate, associated with tap connections from a stationary coil reactor and arranged to progressively change the number of turns of the reactor in the grounding circuit through some given predetermined suitable range, might be utilized.

Figure 4:
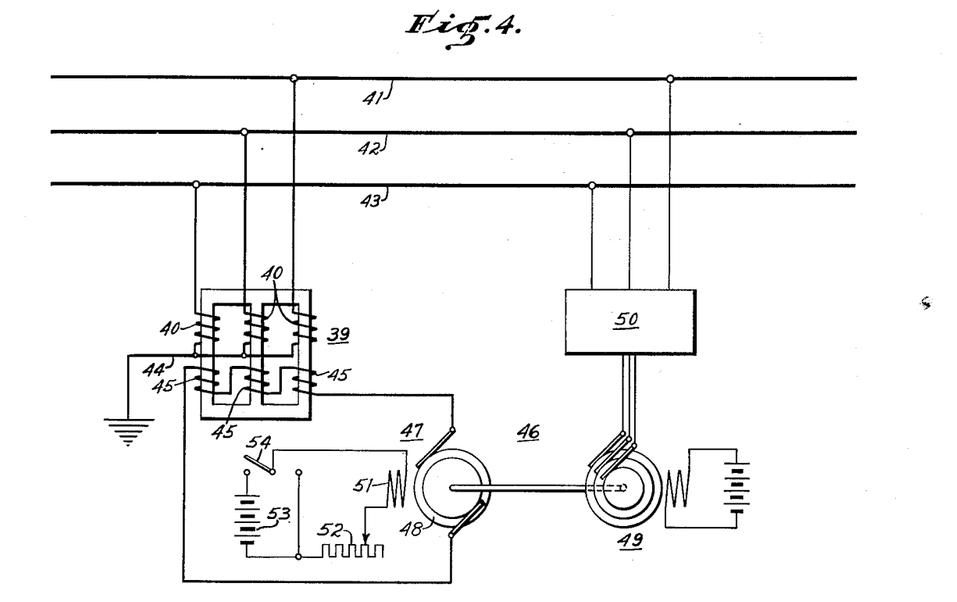
Fig. 4 illustrates, also diagrammatically, a second embodiment of our invention applied to a three-phase system.

A second method for obtaining an automatically variable reactance is shown in Fig. 4. In this scheme, a neutral establishing means or device in the form of a transformer 39 is employed. Star-connected windings 40 are joined with the lines 41, 42 and 43, of the three-phase circuit to be protected, the neutral connection 44 of these windings being grounded as shown. Inductively related to windings 40 are windings 45, connected in delta relation to include the automatically-variable reactance device 46, which functions to change its reactance when a current is sent through it, in the manner to be explained.

As shown, device 46 comprises a synchronous alternating-current generator or motor 47, the armature 48 of which completes the delta connection of the windings 45 of transformer 39. Means for driving machine 47 at a speed corresponding to synchronism with the frequency of the voltages acting in circuit conductors 41, 42 and 43, is provided, as shown, in the form of a synchronous motor 49 energized from the main power circuit through suitable control equipment, represented at 50. The field windings 51, of the synchronous machine 47, are arranged to be short circuited upon themselves through an adjustable resistor 52 or may be energized by some source of constant potential, such as battery 53.

Figure 5:
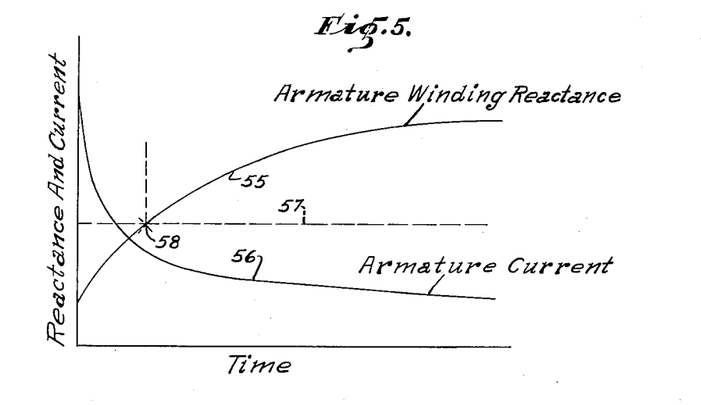

The characteristics of a synchronous generator or motor, connected and operated as in the system of Fig. 4, are illustrated by the curves of Fig. 5. Curve 55 shows the manner in which the reactance presented by the armature winding of the machine varies with respect to time after an alternating-current of synchronous frequency has been started, from some external source, to circulate through the winding, represented in Fig. 4 at 48. Curve 56 shows the manner in which the current decreases in value, assuming the voltage magnitude of the supply source to be substantially constant.

The explanation of the shape of these curves may best be made by assuming that the field 51 of the synchronous machine is short circuited upon itself through resistor 52, connected thereto by switch 54, when closed to the right-hand position. Considering the entire system of Fig. 4, when one of the line conductors 41, 42 and 43 is grounded, an unbalance of voltages among the conductors is set up which causes a current to flow in grounding conductor 44 of the star-connected windings 40. As a result, similar unbalanced voltages are induced in the delta-connected windings 45, and these, failing to neutralize one another, impress the resultant voltage across the armature 48 of the synchronous machine 47.

Since the flux in the field structure of the machine is initially zero, there being no excitation provided, the machine will offer a relatively low effective value of reactance to the flow of current through its armature. The current flowing therein tends to magnetize the field, and magnetic flux begins to build up to overcome the restraint of the "damping" action of the field winding 51, short-circuiting resistor 52, and other minor causes.

This building up of the flux in the magnetic structure of the machine 47 induces voltages in the armature windings which tend to increase the effective reactance presented to current flow from the externally applied voltage. This increase in effective reactance of the armature winding 48 is cumulative, due to the counter-electromotive-force characteristic of the voltage induced in the armature by the flux mentioned, so that, as the flux in the magnetic structure of the machine continues to build up, the reactance increases to still higher values, with the result that some variation in the armature winding reactance as represented by curve 55 in Fig. 5, is realized, and the corresponding armature-current curve 56 results.

The rate of change of reactance with respect to time can be suitably controlled by the design of the machine, and, further, by the value of shunting resistance 52. The purpose of the battery 53 is to further broaden the range of control of reactance rate of change, through the production of an induced voltage in the armature windings, beyond that available through the two means just mentioned should the given application make this desirable or necessary.

As is known in the art, a grounding arrangement, such as is provided by a star-delta connected transformer 39, gives results, as far as arc-extinction purposes are concerned, comparable to the neutral grounding schemes shown and explained in connection with Figs. 1 and 2. In the system of Fig. 4, the tuning of the neutral grounding reactance is accomplished by changing the reactance of the circuit of the delta-connected windings 45 of transformer 39. Thus, if the value of reactance for the armature winding 48, required to produce a resonant condition of the grounding circuit through transformer 39 and suppress the arc, be represented in Fig. 5 by the horizontally drawn line 57, such resonance will occur when the curve 55 intersects line 57, or at point 58. This device, therefore, performs the functions of a self-tuning neutral-grounding reactor, and accomplishes the tuning automatically upon the occurrence of a ground fault.

Figures 6, 7:
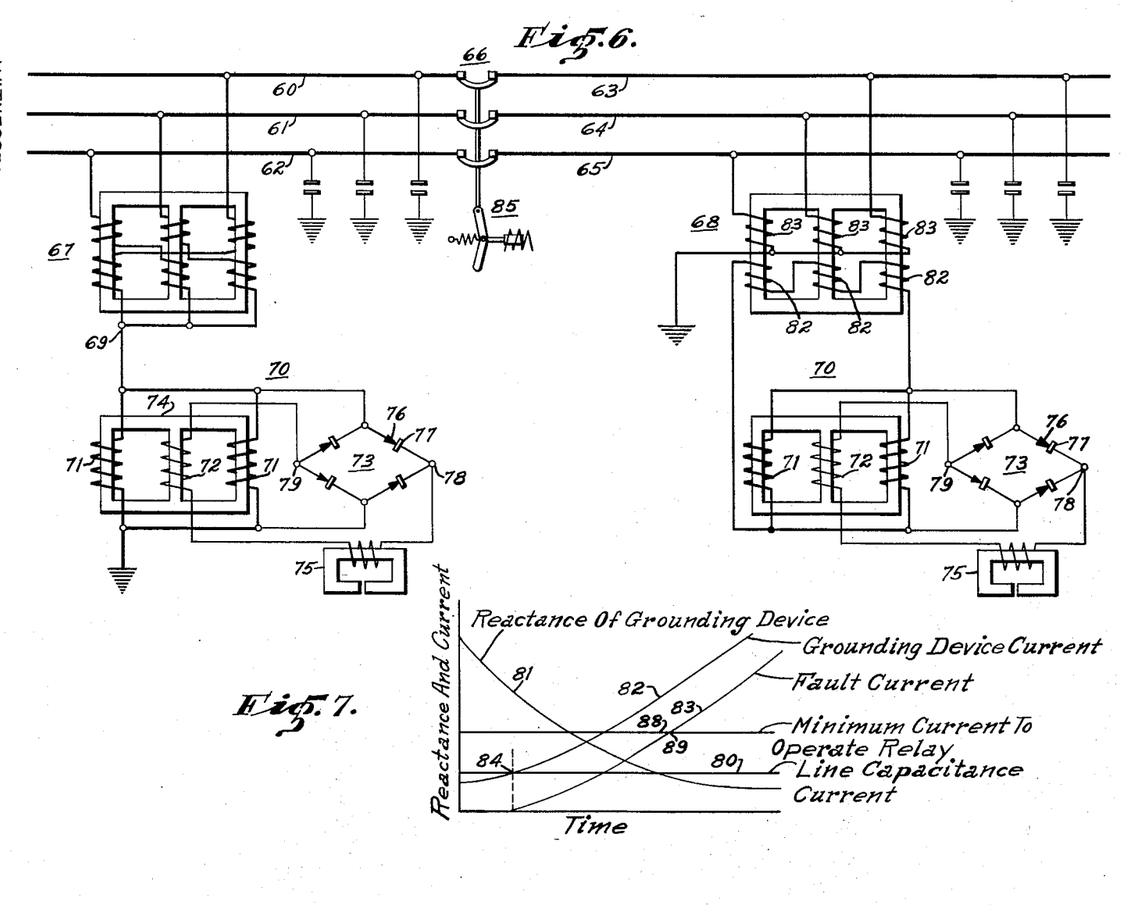

The system shown in Fig. 6 comprises a polyphase power circuit that is provided with means for disconnecting sections of the line upon the occurrence of a fault. One section of this circuit is represented by conductors 60, 61 and 62, and a second section is represented by conductors 63, 64 and 65. Suitable switching means for connecting the last named section with the first are shown in the form of a multi-pole circuit breaker 66. It will be assumed that the source of power for this system is disposed to directly energize conductors 60, 61 and 62 of the first named section.

Each of the system sections is provided with some suitable means for establishing a neutral point, a "zig-zag" transformer of known type being shown at 67, in association with conductors 60, 61 and 62, and a star-delta connected transformer 68 being similarly associated with conductors 63, 64 and 65.

Considering first the power-circuit section shown at the left of the drawings, the neutral point 80 of the system is established at 69 by transformer 67, and between this neutral point and ground is connected a third modification of my invention, the automatically variable grounding reactance device, designated generally at 70.

This device comprises a three-core reactor, in which the two windings 71, on the outer legs of the core structure, are connected in parallel between the system neutral and ground in the manner shown. The winding 72, on the middle leg of the reactor core, is energized, through a full-wave rectifier 73, by direct current obtained, through the action of this rectifier, from the alternating-current voltage which, when device 70 conducts current from the system neutral to ground, is impressed across windings 71 and the alternating-current terminals of rectifier 73.

In operation, a ground fault on any of the lines 60, 61 or 62 of the power system creates a voltage difference between the neutral 69 of the system and the ground. This voltage acting directly on coils 71 of the reactor causes, at first, a relatively small current to flow through them because, the iron circuit 74 of the reactor, being unsaturated, the coil reactance is relatively high. This voltage, in acting upon the rectifier 73, impresses a direct-current voltage upon the exciting winding 72 of the reactor. Current builds up gradually in this last named circuit, and, in so doing, the central winding 72 tends to magnetically saturate the core 74 of the three-core reactor, causing the counter-electromotive forces set up by the currents in the grounding coils 71 to be diminished, and, in this manner, as is well known in the art, the reactance presented by coils 71 is correspondingly diminished.

It will be observed that the full-wave rectifier 73 comprises four similar units, each of which is capable of passing current in one direction only, from the arrow element 76 to the block element 77. An examination of the combination shown will reveal that point 78 in the rectifier connection will assume a positive potential, while point 79 will assume a negative potential, when alternating-current voltage is applied between the remaining and opposite two points of the diamond-shaped connection represented.

In order that the ripples of the direct current supplied from the rectifier, which current is inherently of a pulsating nature, may be partially smoothed out and equalized, it has been found desirable to include in the direct-current circuit a reactor 75. Reactor 75 likewise tends to suppress currents which would result from the alternating-current voltages which any flux pulsations in the middle core leg would induce in winding 72. It will be understood that this reactor is an accessory which does not primarily effect the principle of operation of the neutral grounding device 70, although, in practice, it is found useful and desirable.

Referring to the curves of Fig. 7, the horizontal curve 80 may be taken to represent the line-capacitance current of the ungrounded portion of the system when one of the conductors is grounded, while curve 81 shows the manner in which the reactance of the neutral grounding device 70 varies with respect to time after the occurrence of a fault. The manner in which such reactance variation takes place has been explained.

Curve 82 illustrates the manner in which the current flowing through the neutral-grounding device 70 varies in relation to the change of reactance in the device, shown by curve 81, and curve 83 shows the manner in which the current flowing through the ground fault in the system correspondingly changes. As has already been explained, in connection with the operation of neutral grounding devices for arc suppression, the current in the neutral grounding coil is substantially 180° out of phase with the line capacity current, and, as a result, the current available for flowing through the fault will be the difference of the two first named current values. In the curves shown in Fig. 7, this difference is zero at the time when the reactance of the neutral grounding device is of such value that the current passed by it to ground is of the same magnitude as the line-capacitance current of the ungrounded portion of the system; such condition being shown at 84.

In the section of the polyphase circuit represented by conductors 63, 64 and 65, at the right of the diagram of Fig. 6, the automatically-variable neutral grounding device 70, the construction and operation of which has already been explained, is included in the circuit of the delta-connected windings 82 of the grounding transformer 68, the inductively related star-connected windings 83 being connected and functioning as in the system of Fig. 4 already explained.

In this portion of Fig. 6, shown at the right, the automatically-variable reactor 70 accomplishes the same result as when combined in the manner shown at the left of Fig. 6. As has been explained, in connection with Fig. 4, a ground fault on any one of the lines, 63, 64 and 65 of Fig. 6, results in a voltage unbalance among the coils 82 of transformer 68, which acts upon the reactance device 70 to cause it to lower its reactance progressively, in the manner indicated by curve 81 of Fig. 7, thus causing the effective grounding reactance presented by transformer 68 to follow a similar variation to result in the desired extinction of any arc which may be set up at the ground fault.

To provide means for sectionalizing the faulted portion of the system, the circuit breaker 66 is supplied with a tripping device 85 disposed to be actuated by protective relays of the selective type (not shown) which, in turn, are responsive to fault currents. It will be understood that such selective relays are usually provided with distribution systems of the type now under consideration, and, since they form no part of this invention and are so well known, a showing of them is deemed unnecessary.

As has been explained, the use of constant or continuously tuned reactance neutral-grounding devices interferes with the proper functioning of the selecting relays which are now very generally employed in large systems of distribution for cutting out sections or feeders, should a permanent fault to ground develop, such as occurs when an insulator becomes broken out on the line, since, when the devices are tuned to the approximate resonance required for the most effective arc suppression, the distribution of fault currents over the system tends to become unaffected by the location of the fault. The automatically-variable reactors of my invention overcome this objection in that they provide means for increasing the flow of current through the fault, in case it is of a persisting or of permanent nature, to such value that the operation of protective relays is assured.

In Fig. 7, curve 88 may be taken as representing the minimum fault current required to operate one of the system relays. At the time when the neutral-grounding reactance is tuned to the critical value, as at 84, the fault current is, of course, zero and is entirely ineffective, so far as causing relay operation is concerned. In the case of a solid fault, the reactance of the neutral coil changes progressively away from the critical value, and, in so doing, causes the fault current to correspondingly increase, as indicated by curve 83. At the time when the fault current rises to the value 89, equal to the minimum current required to operate protective relays, one of the system relays, associated with the faulted section, will be actuated to cause sectionalizing breaker 66, to open and thereby isolate the faulted section from the unfaulted portion of the system.

It will be appreciated that the modifications of our invention which have been illustrated in Figs. 1 and 2 likewise lend themselves to the function of fault-current producing, when incorporated with a system of the type illustrated and explained in connection with Fig. 6, since they provide for varying the reactance through a range which may readily be made sufficient for creating the necessary magnitude of fault current.

Figure 8:
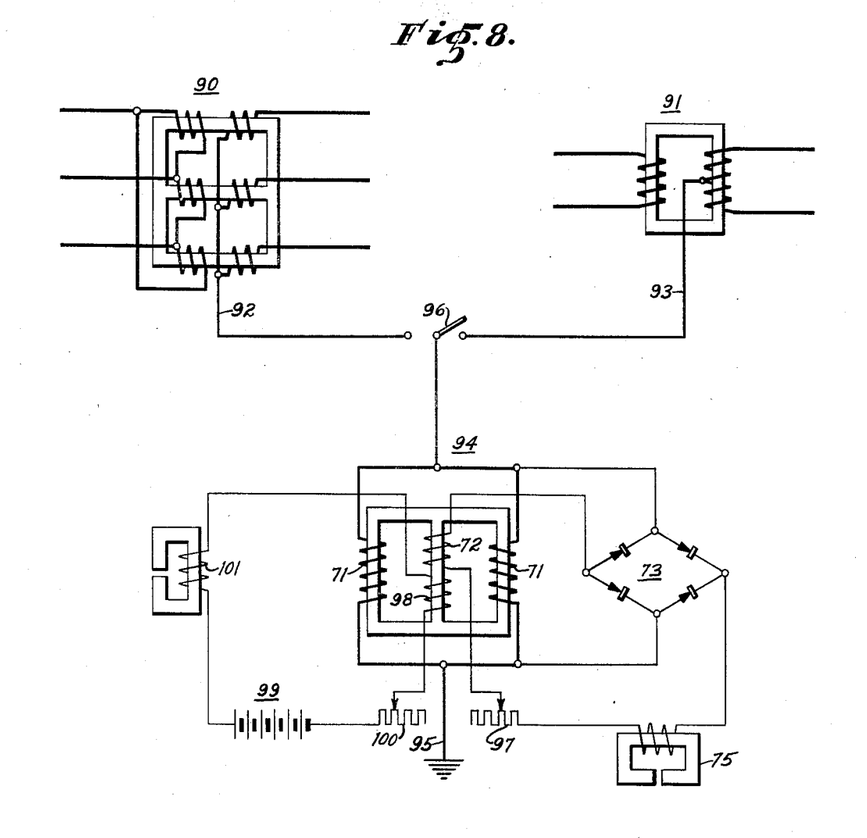

In Fig. 8 we have illustrated a neutral-grounding device of the general type shown and described in connection with Fig. 6, to which certain accessories have been added. We have also indicated another manner in which this device may be combined with a three-phase system, shown at 90, and also with a single-phase system, shown at 91. In the three-phase system, the neutral point 92 is established by the star-delta connected system transformer, which is comparable to that shown at 32 in Fig. 2, and in the single-phase system, the neutral point 93 is established by a system transformer comparable to that shown at 13 in Fig. 1.

As will be seen, the device 94 comprises the three-core reactor, already explained, as having windings 71 on the two outer legs, paralleled, or otherwise suitably combined, to complete the circuit from the system neutral to ground. The full-wave rectifier 73 is likewise disposed to supply direct current to the exciting winding 72 of the middle leg of the reactor, and the riple-smoothing and alternating-current suppressing external reactor 75 is similarly included in this exciting circuit.

To provide for further adjustment of the exciting circuit just mentioned, an adjustable resistor 97, may be included in series circuit relation in the manner shown in Fig. 8. Adjustment of this resistor will affect the rate of reactance change of the device 94, since the amount of resistance in the circuit directly affects the rate at which the current will build up in the exciting winding.

Although not shown, static condensers, or a combination of static condensers and reactors, disposed to act as a filter, may be used to further ensure satisfactory smoothness of current through the central winding 72.

Furthermore, a second direct-current winding 98 may be placed on the central leg of the three-leg reactor and excited from a separate source of direct current, such as battery 99, adjustment of the current through this winding being provided by rheostat 100, so that the steady value of reactance offered by the grounding device 94 may be varied or calibrated, if found desirable. It will be noted that this feature permits partial compensation for varying amounts of line capacitance, and thus minimizes the range of reactance variation upon the occurrence of a fault. Reactor 101 is utilized to suppress the flow of currents which induced alternating voltages in winding 98 would tend to set up.

It will thus be seen that, through our invention, we have provided a combination of arc-suppression and fault-current-producing means, whereby the inductive reactance of a neutral grounding device is progressively changed from a value greater than that required to produce resonance with the system earth capacitance so as to extinguish an arcing type of fault, to another value sufficiently low to produce a fault current of such magnitude as to permit discrimination, by protective relays, between faulted and unfaulted parts of the system to thus allow isolation of the faulted portion, in case of a solid or metallic fault.

It will be understood that the speed or rate of reactance change, in all of the described embodiments of our invention, is capable of being made sufficiently slow to allow ample time for arc suppression when the critical values are being passed through.

Although we have shown and described certain specific embodiments of our invention, we are fully aware that many modifications thereof are possible. Our invention, therefore, is not to be restricted, except insofar as is necessitated by the prior art and by the spirit of the appended claims.

We claim as our invention:

1. In combination with an alternating-current system comprising a source of electromotive force and a plurality of phase conductors each normally differing from ground potential, means for establishing an electrical neutral point in said system, means for connecting said neutral point to the ground through an inductive circuit, and means for changing the reactance of said inductive circuit, upon the grounding of any of the said phase conductors, through a range of values including that required to substantially neutralize the capacity current to ground of the ungrounded part of the system.

2. In combination with an alternating-current system, means for establishing an electrical neutral point in said system, means for connecting said neutral point to the ground through an inductive circuit, and means for changing the reactance of said inductive circuit through a predetermined range of values, upon the passage of current through said circuit.

3. In combination with an alternating-current system comprising a plurality of phase conductions each normally differing from ground potential, means for establishing an electrical neutral point in said system, means for connecting said neutral point to the ground through an inductive circuit, and means for changing, upon the grounding of any of said phase conductors, the reactance of said inductive circuit progressively through a predetermined range of values, said range to include the reactance value required to substantially neutralize the capacity current to ground of the ungrounded part of the system, to thereby effect arc suppression at the point of phase conductor grounding, and the reactance value required to cause, in case of a solid fault from conductor to ground, the point of breakdown to draw a fault current of substantial magnitude.

4. In an electrical system, an alternating-current apparatus having a neutral point, an inductor connected between said neutral point and the ground, and means whereby, upon grounding a portion of the system, the inductor is caused to change its reactance from a given value above that required to substantially neutralize the capacity current to ground of the ungrounded part of the system, successively through intermediate values, including that required for capacity current neutralization, to those of a given lower value of such magnitude that, in case of a solid fault from the system to ground, the said point of breakdown will draw a fault current of substantial magnitude.

5. In an electrical system, in combination, an alternating-current apparatus having a neutral point, an inductive reactance device having a magnetic circuit and alternating-current and direct-current windings linked therewith, means for connecting the alternating-current windings between said system neutral point and the ground, a current rectifier, and means for connecting said rectifier between said direct-current winding and the said system neutral point and ground to permit energization, by a direct-current, of said winding when an alternating-current voltage is set up between the said neutral point and the ground, said reactance device being so disposed that energization of the direct-current winding saturates the magnetic circuit and thereby lowers the reactance of the alternating-current windings thereon.

6. In an alternating-current system, means for establishing an electrical neutral point therein, means for connecting said neutral point to the ground through an inductive circuit, means for changing the reactance of said inductive circuit in response to a current flow therethrough, said reactance-changing means comprising, in combination, a reactor having a controlled winding and a controlling winding disposed to act upon interrelated magnetic circuits, means for connecting said controlled winding in said inductive circuit to control the reactance thereof, a current rectifier, means for connecting the direct-current side of the rectifier to the controlling winding of the reactor, and means for connecting the alternating-current side of the rectifier to the controlled winding of the reactor to permit energization therefrom, the magnetic circuits of said reactor being disposed to magnetically saturate upon energization of the controlling winding, said saturation acting to lower the reactance of the controlled winding thereof.

7. In an electrical system, in combination, an alternating-current apparatus having a neutral point, an inductive reactance device having a magnetic circuit, alternating-current and direct-current windings linked therewith, means for connecting the alternating-current windings between said system neutral point and the ground, a current rectifier and means for connecting said rectifier between said direct-current winding and the said system neutral point and ground to permit energization of said winding by a direct-current when an alternating-current voltage is set up between the said neutral point and the ground, and current-pulsation smoothing means interposed between said rectifier and said direct-current winding, said reactance device being so disposed that energization of the direct-current winding saturates the magnetic circuit and thereby lowers the reactance of the alternating-current windings thereon.

8. In an electrical system, in combination, an alternating-current apparatus having a neutral point, an inductive reactance device having a magnetic circuit and alternating-current and direct-current windings linked therewith, means for connecting the alternating-current windings of said device between said system neutral point and the ground, a current rectifier, and means for connecting said rectifier between said direct-current winding and the said system neutral point and ground to permit energization of said winding by a direct-current when an alternating-current voltage is set up between the said neutral point and the ground, said reactance device being so disposed that energization of the direct-current winding saturates the magnetic circuit and thereby lowers the reactance of the alternating-current windings thereon, and an auxiliary direct-current winding associated with said reactance-device magnetic circuit disposed for constant energization of adjustable intensity to effect partial saturation of said magnetic circuit to thereby adjust the range of reactance through which the device is capable of changing.

9. In an alternating-current system, means for establishing an electrical neutral point therein, an inductive circuit connecting said neutral point to the ground, means for changing the reactance of said inductive circuit in response to a current flow therethrough, said reactance-changing means comprising an alternating-current, synchronous-type, dynamo-electric machine having armature and field windings, means for connecting said armature windings to influence said inductive circuit to control the reactance thereof, means for connecting said field windings to an adjustable resistor, and means for driving said dynamo-electric machine at a speed synchronous with the frequency of the said alternating-current system.

10. In an alternating-current system, means for establishing an electrical neutral point therein, means for connecting said neutral point to the ground through an inductive circuit, means for changing the reactance of said inductive circuit in response to a current flow therethrough, said reactance-changing means comprising, in combination, an alternating-current, synchronous-type, dynamo-electric machine having armature and field windings, means for connecting said armature windings to influence said inductive circuit to control the reactance thereof, means for connecting said field windings to an adjustable resistor, and means for driving said dynamo-electric machine at a speed synchronous with the frequency of the said alternating-current system, said dynamo-electric machine being disposed, upon a current flow through the armature windings thereof, to progressively change the reactance effective in said windings through a predetermined range.

11. In an alternating-current system, means for establishing an electrical neutral point therein, means for connecting said neutral point to the ground through an inductive circuit, means for changing the reactance of said inductive circuit in response to a current flow therethrough, said reactance-changing means comprising an alternating-current, synchronous-type, dynamo-electric machine having armature and field windings, means for connecting said armature windings to influence said inductive circuit to control the reactance thereof, means for energizing said field windings from a source of direct-current voltage of adjustable magnitude, said dynamo-electric machine being disposed, upon a current flow through the armature windings thereof, to progressively change the reactance effective in said windings through a predetermined range, said energizing means for the field windings acting to determine the range through which the armature windings are capable of changing their reactance, by the setting up therein of an induced voltage of adjustable magnitude.

12. An alternating-current system having a neutral point, an adjustable inductive-reactance device connected between said neutral point and the ground, motive means for causing the reactance of said device to progressively change from a given high value to a given low value, means for setting said motive means into operation upon the occurrence of a ground fault within said system, said reactance variation being disposed to include the value required to substantially neutralize the capacity current to ground of the ungrounded portion of the system.

13. In an alternating-current system, means for establishing an electrical neutral point, means for connecting said neutral point to the ground through an inductive circuit, means for changing the reactance of said circuit through a predetermined range, motive means for operating said reactance-changing means, a capacitor connected between each system conductor and a common point, and a relay interposed between said common point and the ground to be responsive to current flow thereto, said relay being disposed to control the operation of said motive means upon the occurrence of a ground fault within the system.

SAMUEL B. GRISCOM.
ROBERT D. EVANS.